United States Patent [19]
Debortoli et al.

[11] Patent Number: 5,949,946
[45] Date of Patent: Sep. 7, 1999

[54] FACEPLATE WITH OPTICAL ADAPTER CARRIER

[75] Inventors: George Debortoli, Ottawa; Harley Robert William Summach, Ashton; Claude LeBlanc Major, Gloucester, all of Canada

[73] Assignee: Nortel Networks Corporation, Montreal, Canada

[21] Appl. No.: 08/975,661

[22] Filed: Nov. 21, 1997

[51] Int. Cl.[6] .................................................... G02B 6/36
[52] U.S. Cl. ........................................ 385/134; 385/137
[58] Field of Search ................................ 385/134–137, 385/53

[56] References Cited

U.S. PATENT DOCUMENTS

| | | | |
|---|---|---|---|
| 5,052,775 | 10/1991 | Bossard et al. | 385/76 |
| 5,096,439 | 3/1992 | Arnett | 439/536 |
| 5,302,140 | 4/1994 | Arnett | 439/557 |
| 5,446,822 | 8/1995 | Keith | 385/135 |
| 5,638,481 | 6/1997 | Arnett | 385/135 |
| 5,708,742 | 1/1998 | Beun et al. | 385/53 |

*Primary Examiner*—John D. Lee
*Assistant Examiner*—Victoria D. Hao

[57] ABSTRACT

A faceplate for a front edge of a printed circuit board has a detachable carrier for supporting an optical fibre connector adapter. The carrier has open and closed positions. When the carrier is in the closed position, a front portion of the adapter extends through an opening formed within the faceplate. To remove the adapter, the carrier is pivoted along a wall of the faceplate. When the carrier has been pivoted approximately 90 degrees from the axis of the faceplate, the carrier can be lifted out of the faceplate, and the adapter can be removed from the carrier if desired. According to another embodiment, allowing access to the adapter from the front of the faceplate, the adapter is removably retained in a mounting within the faceplate by a retaining spring. A door, pivotable from below the mounting, has an open and closed position. The door can pivot from an open position, exposing the adapter and adapter housing, to a closed position, securing the adapter and covering the adapter except for a top portion of the adapter.

17 Claims, 10 Drawing Sheets

FACEPLATE WITH OPTICAL ADAPTER CARRIER

FIELD OF THE INVENTION

The invention relates to faceplates used with circuit packs or printed circuit boards and is particularly concerned with faceplates having optical adapter carriers or mountings.

BACKGROUND OF THE INVENTION

Printed circuit boards may have optical fibres extending therefrom. When such printed circuit boards are vertically mounted in shelves, each printed circuit board typically has a faceplate. The faceplate accommodates a universal adapter. A rear opening of the adapter is formed to receive a connector attached to the fibre from the printed circuit board. A portion of a forward end of the universal adapter typically extends through an opening in the faceplate. Another optical fibre is connected to the forward end of the universal adapter through another connector.

In the prior art, it is typically necessary to remove the universal adapter when a different type of connector is to be used (different types of connectors include bayonet, thread and push-in connectors) or when it is necessary to clean the adapter and/or connectors.

The universal adapter is typically held in place in the faceplate by a screw or by a mounting unit held in place by one or more screws. Accordingly, with the prior art, in order to remove the adapter, it is usually necessary to unscrew the retaining device using a screw driver or other tool. Further, since the screws face rearward on the rear surface of the faceplate, it is also typically necessary to remove the faceplate from the circuit pack (or from the unit containing the circuit pack), in order to remove the adapter. Accordingly, it is desirable to have a modified faceplate which need not be removed from the circuit pack in order to remove the adapter. Similarly, it would be desirable to be able to easily remove the adapter without the need for tools.

U.S. patent application Ser. No. 08/666,702 (inventor: Beun), which was filed on Jun.18, 1996 and assigned to the assignee of the present application (U.S. Pat.5,708,742), overcomes some of the above-noted drawbacks. The Beun application describes a faceplate in which the adapter is held in place within a removable carrier. The faceplate has a hinged portion on the front surface of the faceplate, which, when in the open position, allows access to the carrier and the adapter. To remove or replace the adapter, the hinged portion is rotated to the open position, thereby exposing the adapter and adapter carrier. To remove the carrier, first two relatively small pins on the carrier are squeezed together, which releases the pins from corresponding guide channels in the faceplate. The carrier can then be moved upwards and removed from the faceplate. The adapter within the carrier may then be removed from the faceplate for cleaning.

Removal of the carrier from the Beun device requires that the relatively small pins of the carrier be squeezed, which may be difficult or awkward, especially where to user has large fingers or where the lighting is poor. The Beun device also requires a removable carrier. If there were no removable carrier, there would be one less part to be manufactured, thereby possibly reducing costs. The lack of a removable carrier would also eliminate the likelihood of that part breaking, being lost or not working.

Another disadvantage of the Beun device is that there must be a certain amount of slack in the fibre from the printed circuit board to allow the fibre connector to be connected to and disconnected from the adapter. The more slack there is, the greater the risk that the fibre will bend to create a radius within the fibre that is less than optimal. Accordingly, it would be desirable if less slack was necessary.

SUMMARY OF THE INVENTION

It is an object of the invention to obviate or mitigate one or more of the above identified disadvantages.

According to the first broad aspect, the invention provides a faceplate for a circuit pack having electronic and optical components including a rear fibre connector extending from an optical fibre, the faceplate having an opening therein through which an adapter may extend for connecting a forward fibre connector to the rear fibre connector, wherein the faceplate comprises an adapter carrier having adapter mounting means for removably mounting the adapter, the carrier being pivotable along a rear surface of the faceplate from a closed position approximately axially aligned with the faceplate to an open position, the carrier being detachable from the faceplate when in the open position.

According to another broad aspect, the invention provides a faceplate for a circuit pack having electronic and optical components including a rear fibre connector extending from an optical fibre, the faceplate comprising: an adapter mounting for mounting an adapter substantially along the axis of the faceplate, the adapter being used for connecting a forward fibre connector to the rear fibre connector; a door pivotable from an open position, exposing the adapter mounting, to a closed position, covering the mounting and the mounted adapter, except for a top portion of the forward opening of the adapter; and a gap formed within a portion of the faceplate between a lower edge of the adapter mounting and the bottom edge of the door.

According to yet another broad aspect, the invention provides a combination of a faceplate and a circuit pack, the circuit pack having electronic and optical components including a rear fibre connector extending from an optical fibre, the faceplate having an opening therein through which an adapter may extend for connecting a forward fibre connector to the rear fibre connector, wherein the faceplate comprises an adapter carrier having adapter mounting means for removably mounting the adapter, the carrier being pivotable along a rear surface of the faceplate from a closed position approximately axially aligned with the faceplate to an open position, the carrier being detachable from the faceplate when in the open position.

Advantages of one embodiment of the invention, relating to a side access adapter carrier, include the following: the adapter can be removed from the carrier and faceplate easily and without the need for tools and without needing to remove the faceplate; the user can look into the circuit pack without having to remove the faceplate; and the optional use of a safety flap over the adapter reduces the possibility of eye damage from the laser. Advantages of another embodiment of the invention, relating to a front access adapter mounting, include the following: the adapter can be removed from the mounting and the faceplate easily and without the need for tools and without need to remove the faceplate; there is no need to have a removable carrier, reducing the need for an extra part; front access provides good visibility for removing the adapter, attaching parts or examining parts; front access allows for an intuitive mechanism for allowing access to and removal of the adapter.

BRIEF DESCRIPTION OF THE DRAWINGS

Preferred embodiments of the invention will now be described with reference to the attached drawings in which

FIG 1b is a magnified view of the circled portion of FIG 1a;

FIG. 3b is a magnified view of the circled portion of FIG. 3a;

DETAILED DESCRIPTION OF THE PREFERRED EMBODIMENTS

Figure 1A:
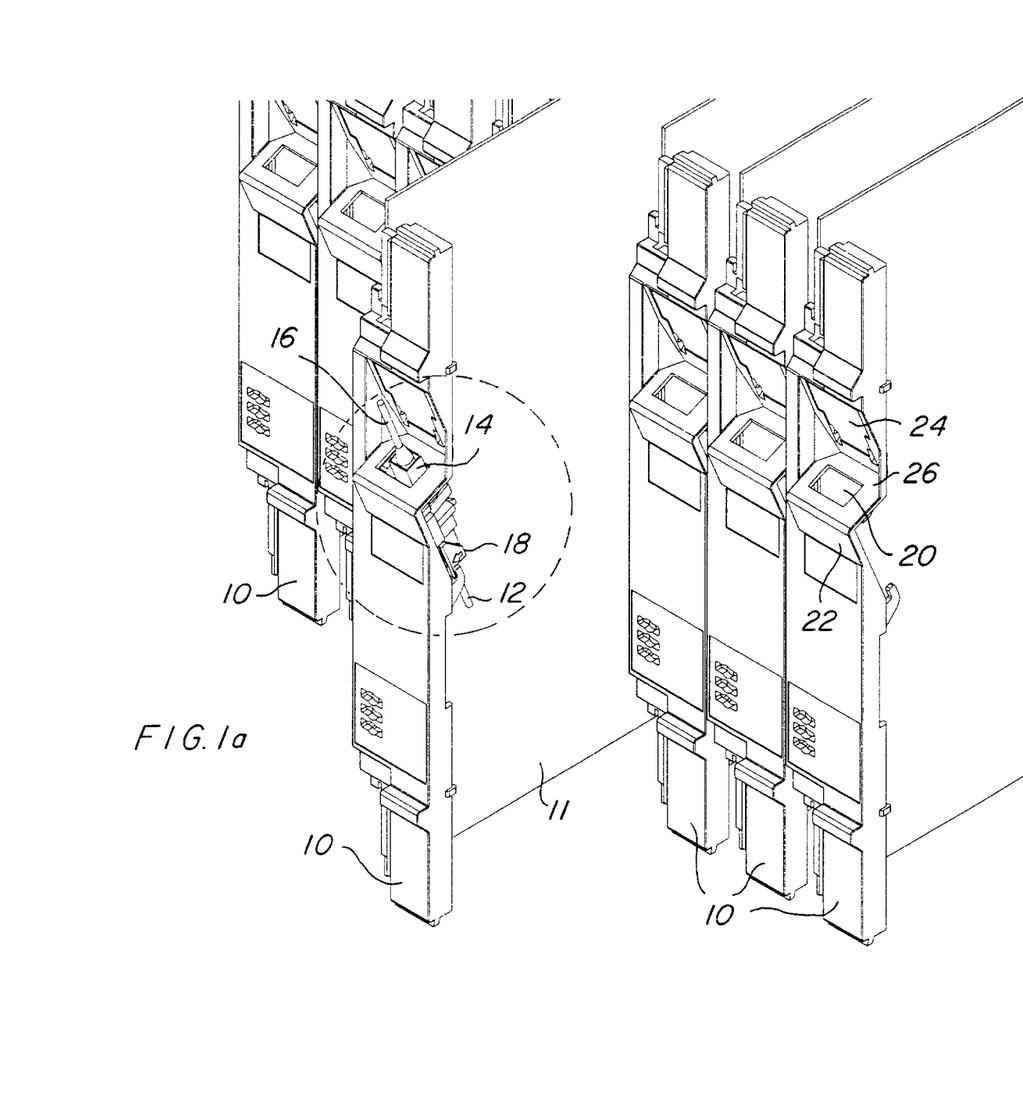
FIG 1a is a front perspective view of a series of vertically oriented faceplates, according to one embodiment of the invention, with one faceplate slid forward of the others.
Figure 2A:
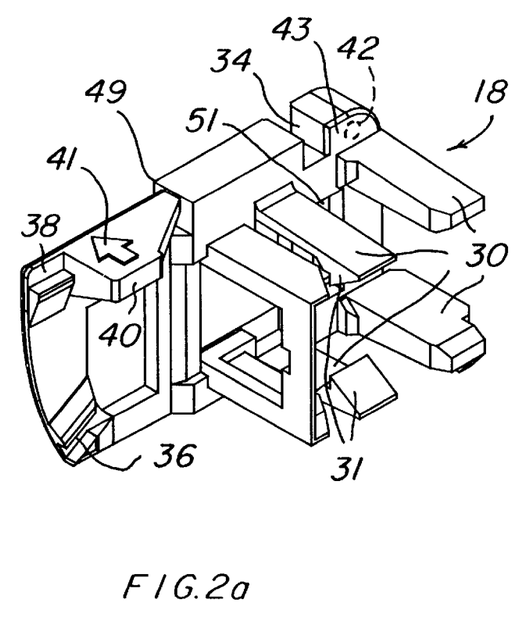
FIG. 2a is a perspective view of a carrier.
Figure 2B:
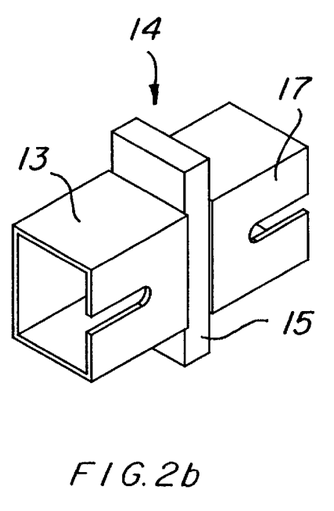
FIG. 2b is a perspective view of a universal adapter.

Referring to FIG 1a, there is illustrated a series of vertically oriented faceplates 10, in perspective view, showing the front portions and sides of some of the faceplates. Each faceplate 10 is preferably made of polycarbonate plastic. Each faceplate 10 is preferably connected to a circuit pack 11 extending backwards therefrom, having a printed circuit board (not shown) and heat sinks (not shown). Each circuit pack 11 has an optical fibre (not shown) extending therefrom terminating in a rear connector 12. The rear connector 12 fits slidably within an opening formed within rear end 13 of an adapter 14. A perspective view of an adapter 14 is shown in FIG. 2b. A forward connector 16 attached to another optical fibre (not shown) fits slidably within a forward end 17 of the adapter 14. A bore (not shown) formed within the central portion 15 of adapter 14 allows laser light to travel from the rear connector 12 to the forward connector 16.

The adapter 14 is mounted within faceplate 10 by means of a carrier 18. As shown in FIG 1a, the carrier 18 holds the adapter 14 in place such that the forward end of the adapter 14 projects through an opening 20 formed within a wall 26 of faceplate 10.

Wall 26 forms part of a step created within faceplate 10 by walls 22, 24, 26. The design of the front surface of the faceplate 10, as shown in FIG 1a, is similar to current faceplate designs. It is desirable, to the extent possible, to keep the front design similar to the current design to maintain customer satisfaction and to maintain a consistent design where some faceplates in a series may be from older stock and some faceplates may be from newer stock.

The adapter 14 is mounted on the rear surface of wall 22. Wall 24 is preferably parallel to wall 22, to allow access to the forward connector 16 when it is attached to adapter 14 and to be consistent with current faceplate designs, as discussed above.

Wall 22, and hence adapter 14 when it is supported on the rear surface of wall 22, are oriented at approximately 22.5 degrees from the vertical plane of the faceplate 10 to allow relatively easy placement and removal of the connectors 12, 16 within adapter 14.

The adapter 14 is mounted within a carrier 18. A perspective view of the carrier 18 is shown in FIG. 2a. The carrier 18 is preferably made of a flexible polycarbonate plastic. The carrier 18 has four resiliently flexible retaining arms 30 for retaining the adapter 14. Preferably, at least two corresponding retaining arms 30 have hook elements 31 to allow the adapter to be snapped into the carrier 18 and held securely in place. Of course, different numbers and shapes of the retaining arms 30 could be used to accomplish the same result. The carrier 18 has a support structure 32, which supports the adapter 14 and has an opening through which connector 12 passes when it is connected to adapter 14.

Figure 3C:
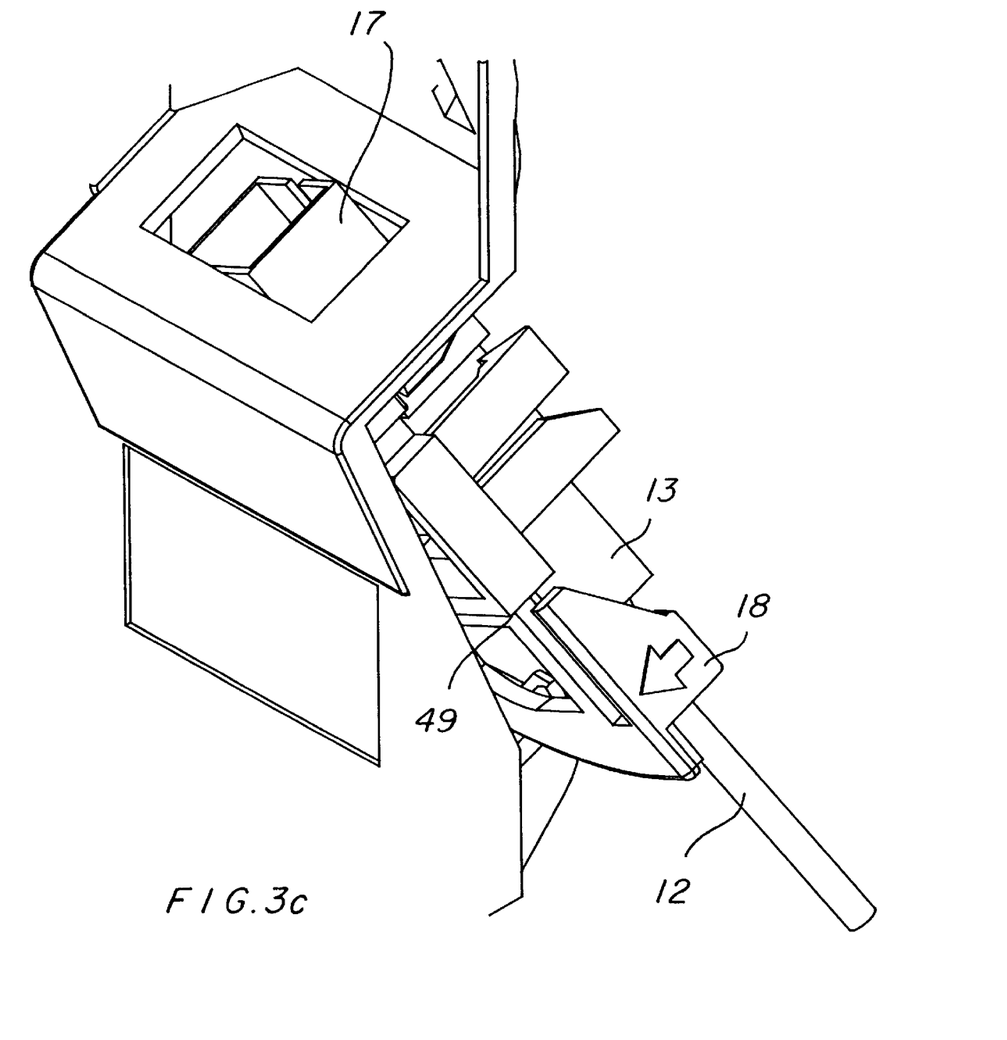
FIG. 3c is a magnified, front perspective view of a portion a faceplate with the carrier in a partially open position.
Figure 4A:
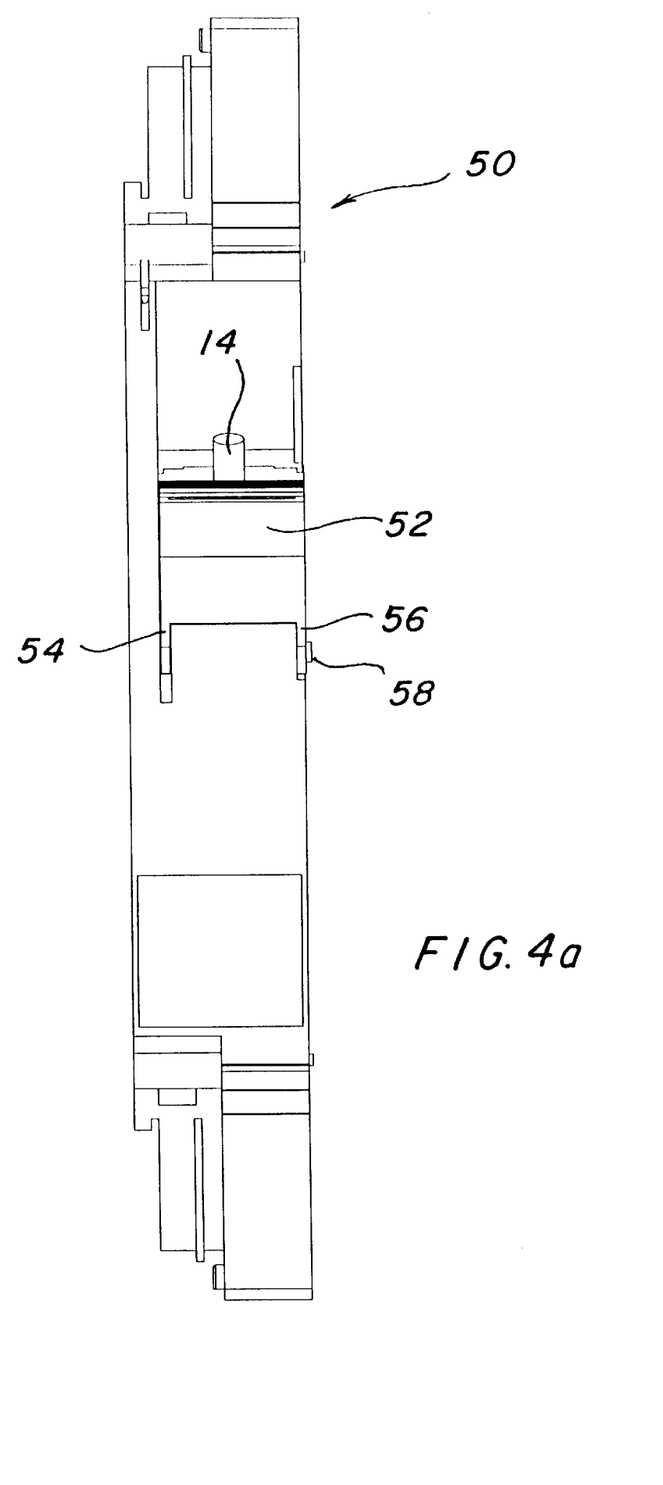
FIGS. 4a and 4b are front and front perspective views of a faceplate, respectively, according to another embodiment of the invention, with a door in the closed position.
Figure 4B:
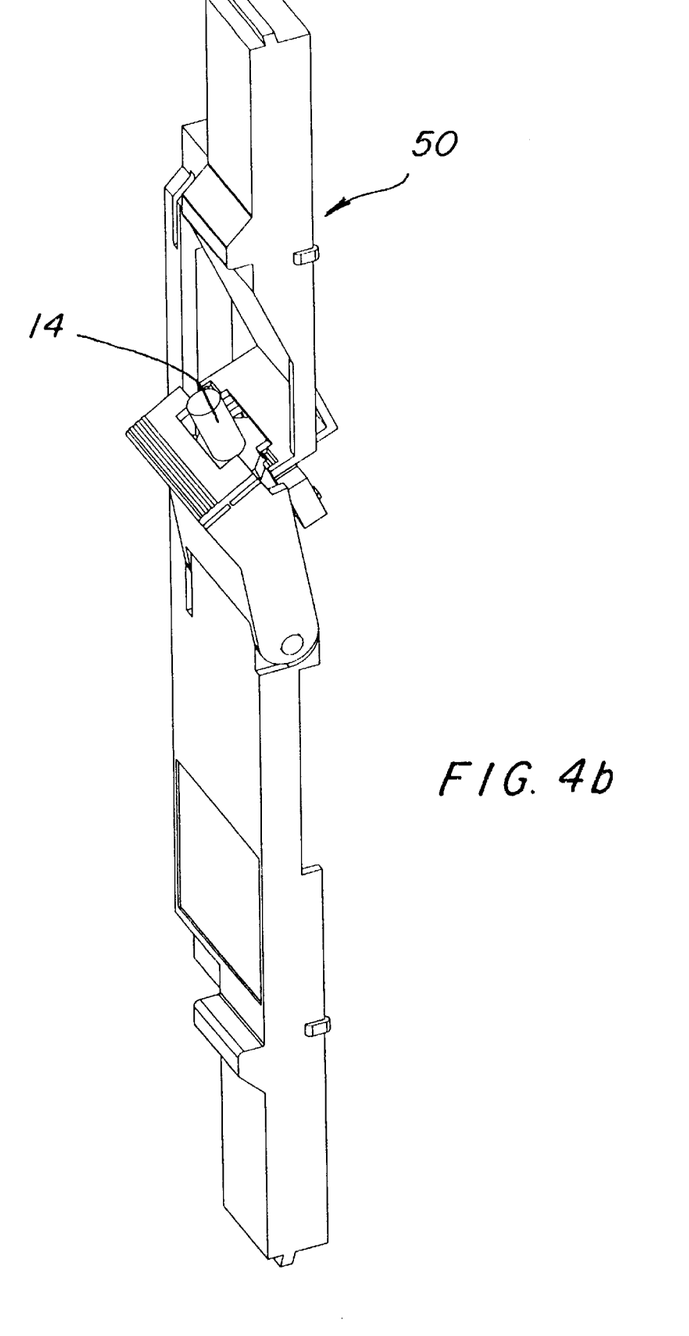
Figure 4C:
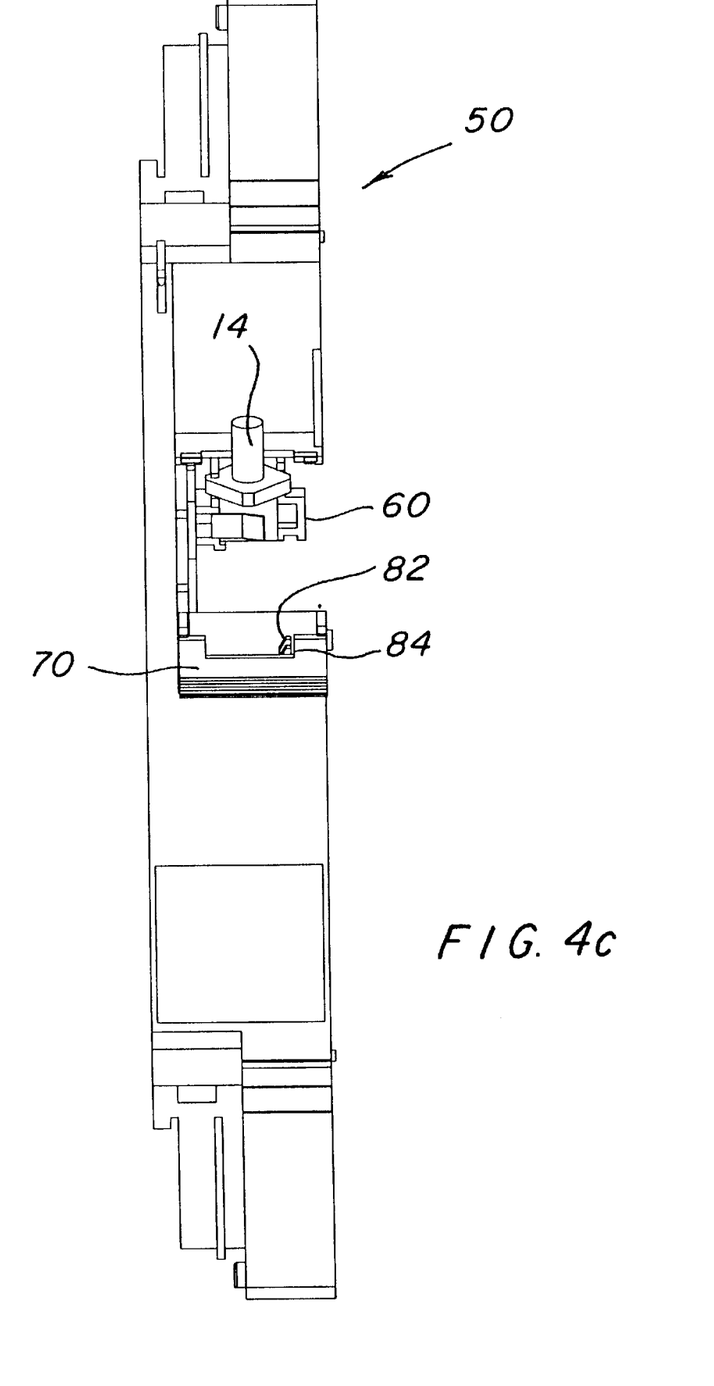
FIG. 4c is a front view of the faceplate of FIGS. 4a and 4b, with the door in the open position.
Figure 4D:
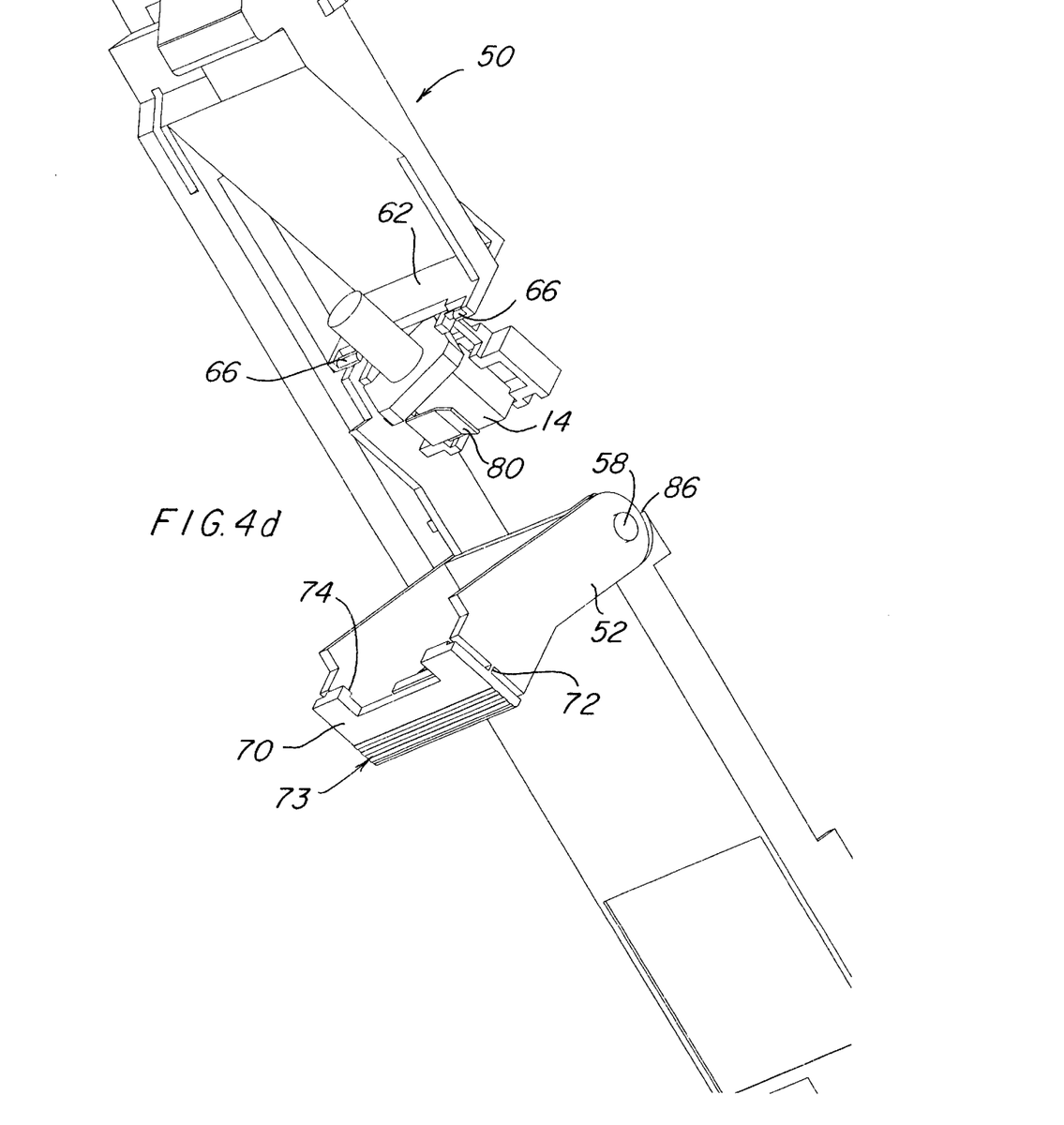
FIG. 4d is an enlarged perspective view of the faceplate of FIG. 4c.

The carrier 18 has an indentation 34 formed within one side and two detent means 36, 38 along its lower edge. The carrier also has a surface 40, designed to allow a user to push thereon in the direction of arrow 41. In order for the surface 40 to be able to be pushed in the direction of arrow 41, the rear surface of the carrier 18 has a step portion 49 which, when the carrier 18 is not being manually pushed in the direction of arrow 41, maintains the portion of the carrier 18 below surface 40 a distance above the rear surface of faceplate 10, as seen in FIGS. 2a and 3c. As also partially shown in FIG. 2a, the flat surface of the carrier 18 has incorporated therein at least one opening 51 to accommodate the central portion 15 of adapter 14, because in some constructions of the universal adapter 14, the central portion 15 will extend rearwardly beyond the flat surface of the carrier when mounted within the carrier (consider, for example, the opening 78 in mounting 60 of FIG. 4e which performs the same function as opening 51 in FIG. 2a and the construction of adapter 14 as shown in FIG. 4d, which show a different embodiment of the invention, as described below).

Figure 3A:
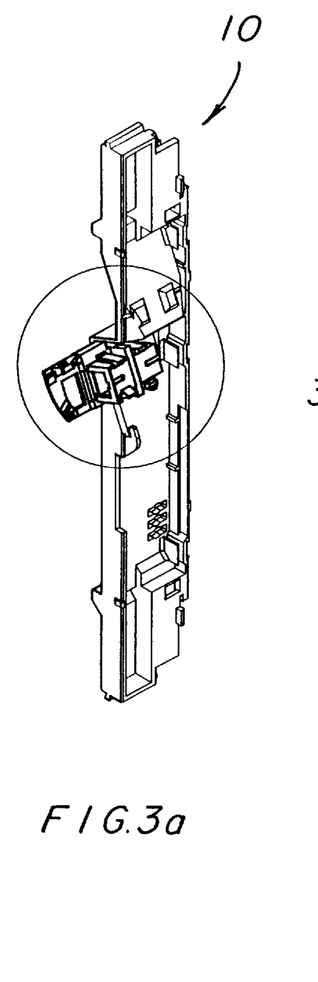
FIG. 3a is a rear perspective view of a faceplate, with the carrier in the open position.
Figure 3B:
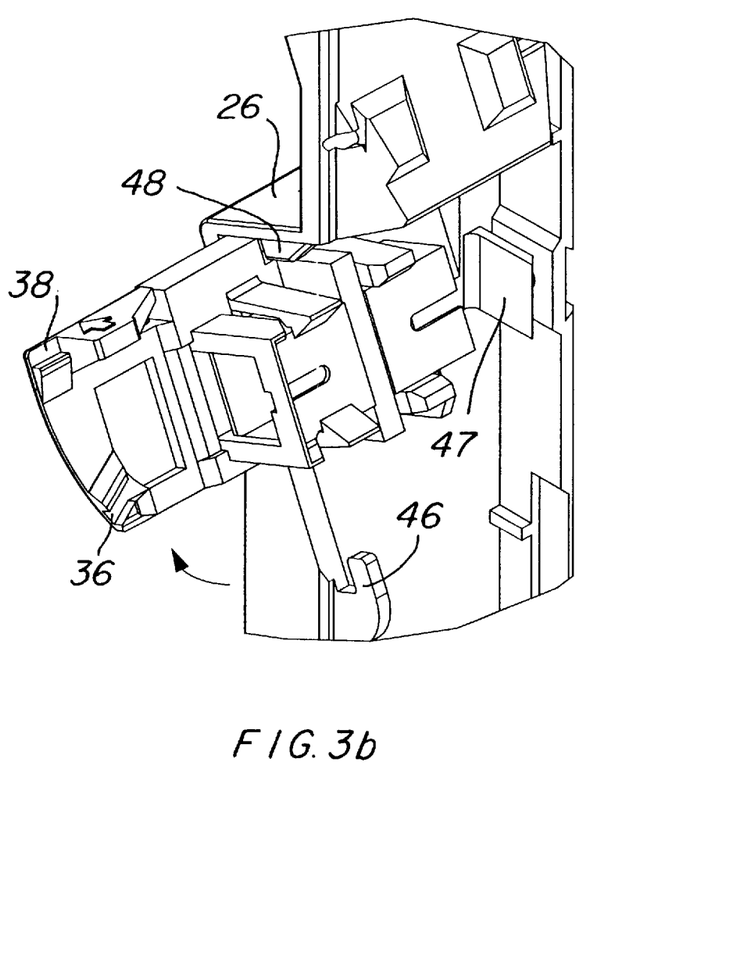

In order to support the carrier 18, either wall 22 of faceplate 10 extends the length of carrier 18 or else only the edge of wall 22 extends the length of carrier 18, as shown in FIGS. 3a and 3b.

The rear surface of the carrier 18 (not shown) has a bore 42 as shown in broken lines in FIG. 2a, near indent 18, which extends from the rear surface of the carrier 18, part way towards the front surface. The rear surface of wall 22 has a pin (not shown) extending outward therefrom for pivotal engagement with bore 42 of carrier 18.

FIG. 3a shows a rear perspective view of the faceplate 10, with the carrier 18 in the open position. FIG. 3b is a magnified view of the circled portion of FIG. 3a. The rear surface of faceplate 10 has a latch portion 46, which has an inverted "L" shape as seen in FIGS. 1b and 3b.

Figure 1B:
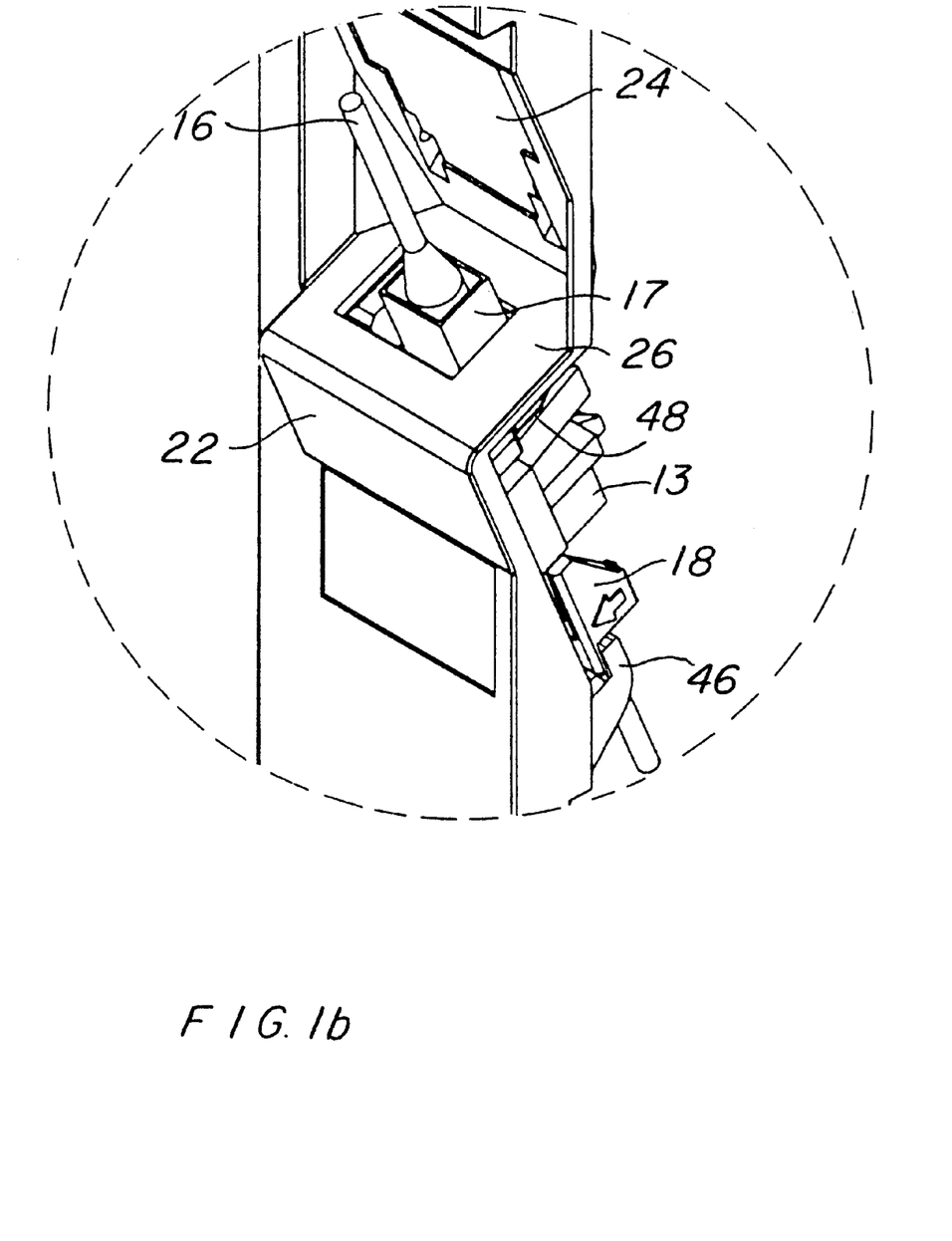

The rear surface of wall 26 of faceplate 10 has a projecting portion 48, which as seen in FIGs 1b and 3b, has a width less than the width of indentation 34 of carrier 18, and the projecting portion 48 extends outwards from wall 22 less than the distance indentation 34 is indented into carrier 34, such that indentation 34 can slidably engage projecting portion 48. Projecting portion 48 is a separated from wall 22 of faceplate 10 a distance just greater than the height of indentation 34 of carrier 18.

To use the carrier 18, first the adapter 14 is pushed between retaining arms 30 until the adapter 14 is held in place by hook elements 31. The carrier 18 is then connected to faceplate 10 by the pivotal engagement of the pin extending rearwardly from wall 22 of faceplate 22 (not shown and as described above) with bore 42 of carrier 18. When the indentation 34 of carrier 18 is aligned with projecting portion 48 of faceplate 10, the pin and the bore 42 are necessarily aligned. This alignment is shown in FIG. 3b, where the carrier 18 oriented approximately 90 degrees to the axis of faceplate 10. When the carrier 18 is rotated counterclockwise from the position shown in FIG. 3b, the carrier cannot be removed from faceplate 10 because the lower surface of projecting portion 48 of faceplate 10 abuts surface 43 of carrier 18 and the lower edge of carrier 18 is held under latch 46. The carrier 18 can only be removed from the faceplate 10 when the carrier 18 is returned to the open position shown in FIG. 3b.

From the position shown in FIG. 3b, the carrier 18 is rotated counterclockwise until the latch 46 of the faceplate 10 is securely held within detent means 36, which preferably occurs when the carrier 18 is oriented at approximately 45 degrees from the axis of the faceplate 18. At this point, the rear connector 12 (ie, the connector extending from the optical fibre connected to the circuit board) may be connected to the opening within the rear portion 13 adapter 14, as shown in the magnified, front perspective view of FIG. 3c.

To rotate the carrier 18 from the position shown in FIG. 3c, the latch 46 is disengaged from detent means 36 by a user manually pressing on the carrier 18 near detent means 36 towards faceplate 10, until the detent means are pushed below the lower surface of latch 46. The carrier 18 can then be rotated counterclockwise until the forward edge of carrier 18 (the forward edge is the edge most distant from the detent means 36, 37) contacts the rear surface of wall 26, at which time the carrier is axially aligned with faceplate 10 and the carrier is held in this position by detent means 38 of carrier 18 against latch 46 of faceplate 10. The faceplate 10 also preferably has a support arm 47 projecting outward from the rear surface of faceplate 10, as shown in FIG. 3b, for further securing the carrier 18 in place in the closed position. In this position, the forward end of adapter 14 projects through the opening within wall 26 of faceplate 10. The forward connector 16 can now be connected to the opening within the forward portion 17 of adapter 14, as shown in FIG 1b.

A safety flap, not shown, may be hingedly connected to wall 24 to cover the forward opening of adapter 14 when connector 16 is not connected to the adapter. The flap can be rotated out of the way when the connector 16 is to be connected to the adapter 14.

When the carrier is to be removed to clean the connectors 12, 16 or the adapter 14 or for replacing any of these parts, the reverse process is performed. First, the faceplate 10 and attached circuit pack 11 must be slid ahead of the other faceplates, to allow access to the carrier 18, as shown in FIG 1a(which does not show the steel card guides along which the faceplate 10 and circuit pack 11 would travel). Then the forward connector 16 is removed from the adapter 14 (by pulling the connector 16 away from the adapter 14). Then the carrier 18 must be rotated. Before rotating the carrier 18, the detent means 38 of the carrier 18 must first be released from latch 46 of faceplate 18 by manually pressing on surface 40 of carrier 18 (see FIG. 2a) in the direction of arrow 18 until the top surface of detent means 38 is clear of the bottom surface of latch 46. The carrier 18 can now be rotated clockwise until the detent means 36 of carrier 18 engages latch 46 of faceplate 10, as shown in FIG. 3c. The rear connector 12 can now relatively easily be removed from adapter 14 by pulling connector 12 away from adapter 14.

The carrier 18 can be disengaged from latch 46 by manually pressing carrier 18 near detent means 36 towards faceplate 10 until the top surface of detent means 36 is clear of the bottom surface of latch 46. The carrier 18 can then be rotated clockwise until projecting portion 48 of faceplate 10 is aligned with indentation 34 of carrier 18. In this position, preferably, approximately 90 degrees from the axis of the faceplate 10, the carrier 18 can be lifted out of faceplate 10. Once the carrier 18 has been removed from the faceplate 10, the adapter 14 can either be cleaned while held within the carrier 18 or the adapter 14 can be removed from the carrier 18 by manually pulling hook portions 31 of retaining arms 30 away from each other until adapter 14 can be lifted out of the carrier 18.

The above-noted embodiment considered a side-access adapter carrier. Another embodiment of the invention, as shown in FIGS. 4a–4 e, incorporates a front-access adapter carrier or mounting. The front-access embodiment of a faceplate 50 has a door 52, which is pivotally connected to faceplate 50 from the lower arms 54, 56 of door 52 by pins 58 engaged through corresponding bores (not shown) in the arms 54, 56 and faceplate 50. FIGS. 4a and 4b are front and front perspective views of the faceplate 50, respectively, showing the door 52 in the closed position, with the forward end of adapter 14 projecting over the door 52.

The faceplate 50, just below arms 54, 56 of door 52, preferably has curved indentations 58 corresponding in part to the curve of the bottom portion of the arms 54, 56. The lower portion of each indentation 58 is flat, as seen in FIGS. 4b, 4d and 4e, for supporting the door 52 at approximately a right angle to the axis of the faceplate 50, when the door 52 is in the open position.

The description below may be considered with reference to FIGS. 4c–4 e. FIG. 4c is a front view of the faceplate 50 with the door 52 in the open position. FIG. 4d is a perspective view of a portion of the faceplate 50 of FIG. 4c, in a larger scale. FIG. 4e is a view similar to the view of FIG. 4d except that the adapter 14 has been removed in FIG. 4e.

The top portion 70 of door 52 is a "living" hinge, which pivots about fulcrum 72. Preferably, the top portion 70 of door 52 has grooves 73 to provide additional friction for the user to push against that surface. Top portion 70 has a gap formed within its forward portion to fit around the forward end of the adapter 14 when the door is in the closed position, as shown in FIG. 4b. On the under surface of the living hinge 70, on either side of the gap, is a hook portion 74, one of which is visible in FIGS. 4d and 4e.

Figure 4E:
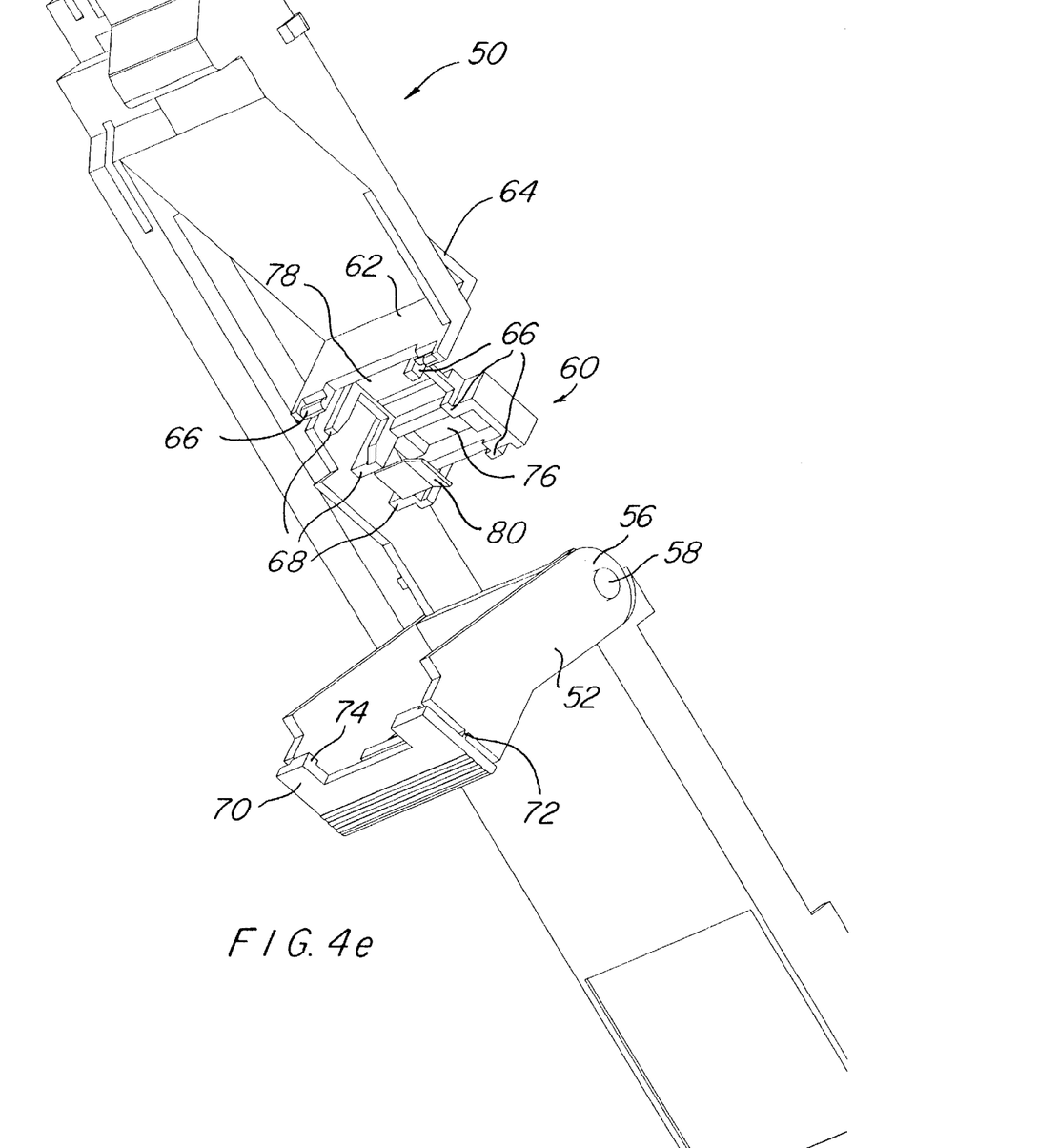
FIG. 4e is a view similar to the view of FIG. 4d where the adapter has been removed.

As shown in FIG. 4e, an adapter mounting 60 is moulded to shelf 62 of the faceplate 50. The adapter mounting 60 is preferably positioned at an angle of approximately 22.5 degrees with respect to the vertical plane of faceplate 50. Similarly, wall 64 of faceplate 50, which projects above shelf 62, projects at approximately the same angle with respect to the vertical plane of the faceplate 50 as adapter mounting 60. An opening exists in faceplate 50 between the lower edge of mounting 60 and the lower edge of door 52, to allow for the opening within the rear portion 13 of adapter 14 to be connected to a connector, as will be described below.

As shown in FIGS. 4d and 4e, a gap is formed within the forward portion of shelf 62 to accommodate the top portion of the adapter 14. The forward edges of the shelf 62 on either side of the gap have bumps or latches 66 which are positioned to engage hooks 74 of the living hinge 70 of door 52, as described below.

Preferably, adapter mounting 60 has three arms 66 and three arms 68 to help hold the adapter 14 in place. However, the number and shape of the arms 66, 68 could differ considerably and perform the same function. Similar to the carrier 18 described in the previous embodiment, and as shown in FIG. 4e, mounting 60 has openings 76, 78 formed within its lower surface to accommodate some types of adapters, such as the type of adapter shown in FIG. 4d. As shown in FIGS. 4d and 4e, the mounting 60 also has a retaining spring 80 for holding the adapter in place.

As shown in FIG. 4c, the door 52 may also have cams 82, 84 extending outwards from an inside surface to help further secure the adapter 14 when the door 52 is in the closed position. In the example shown in FIG. 4c, the cams 82, 84 are wedge-shaped, and when the door 52 is in the closed position, the cams exert pressure leftward on the top portion 17 of adapter 14, to further help hold the adapter 14 securely in place.

To use to the faceplate 50, a connector (not shown) extending from an optical fibre from a printed circuit board (not shown) is connected to the opening with the rear portion 13 of the adapter 14. The adapter 14 is then placed within mounting 60 by first manually lifting retaining spring 80 and placing the adapter 14 between the retaining spring 80 and the mounting 60. A connector from another optical fibre (not shown) is then connected to the opening within the forward portion 17 of the adapter 14. Then, the door 52 is manually pivoted until the hooks 74 on the under surface of the living hinge 70 of door 52 engage with latches 66 near the forward edge of shelf 62.

To clean the connectors or adapter 14 or to replace any of the connectors or adapter 14, first the connector connected to the opening within the forward portion 17 of adapter 14 is removed by pulling the connector away from the adapter 14. The door is then opened by first pressing on the grooved portion 73 of the living hinge 70 of door 52, causing the living hinge 70 to pivot, thereby disengaging hooks 74 from latches 66. The door 52 can then be pivoted to the open position. In the open position, the door 52 is preferably supported at approximately right angles to the axis of the faceplate 50 by the flat portion of the indentations 86 formed within the faceplate 50.

When the door 52 is in the open position, the retaining spring 80 can be manually pulled and the adapter 14 removed from the mounting 60. The connector connected to the opening within the rear portion 13 of the adapter 14 can be removed by pulling the connector away from the adapter 14. If desired, the adapter 14 can be placed in enclosure formed within the open door 52, while the connectors are being cleaned or another operation is performed.

Numerous modifications and variations of the present invention are possible in light of the above teachings. It is therefore to be understood that within the scope of the appended claims, the invention may be practised otherwise than as specifically described herein.

What we claim as our invention is:

1. A faceplate for a circuit pack having electronic and optical components including a rear fibre connector extending from an optical fibre, the faceplate comprises a front surface and a rear surface, the rear surface facing approximately 180° from the front surface, the faceplate having an opening therein through which an adapter may extend for connecting a forward fibre connector to the rear fibre connector, wherein the faceplate comprises an adapter carrier having adapter mounting means for removably mounting the adapter, the carrier being mounted on the rear surface of the faceplate and pivotable laterally along the rear surface of the faceplate from a closed position behind the faceplate to an open position, extending laterally beyond an edge of the faceplate, the carrier being detachable from the faceplate when in the open position.

2. The faceplate of claim 1, wherein the carrier is approximately 90 degrees from the axis of the faceplate when the carrier is in the open position.

3. The faceplate of claim 1, wherein the adapter mounting means comprises a plurality of resiliently flexible retaining arms for detachably mounting the adapter.

4. The faceplate of claim 3 wherein the retaining arms comprise two forward and two rear resiliently flexible retaining arms, the two forward arms being spaced on either side of the adapter near the forward opening of the adapter and the two rear arms being spaced on either side of the adapter near the rear opening of the adapter.

5. The faceplate of claim 4 wherein either the two forward arms or the two rear arms each have a hook portion near their upper ends to hold the adapter in place until the hook portions are manually separated.

6. The faceplate of claim 1 wherein the carrier and the faceplate further comprise a retaining means for retaining the carrier in the closed position until the retaining means is disengaged.

7. The faceplate of claim 6 wherein the retaining means comprises a detent means formed within a lower portion of the carrier which detent means is held by a latch means formed within the rear surface of the faceplate, wherein the retaining means can be disengaged by pushing on a lower portion of the carrier until the detent means is pushed below the latch means.

8. The faceplate of claim 7 wherein the faceplate and carrier further comprise a second retaining means for securely holding the carrier in a position approximately between 30 and 45 degrees from the axis of the faceplate.

9. The faceplate of claim 8 wherein the second retaining means comprises a detent means formed within a lower portion of the carrier which intersects with the latch means when the carrier is in a position approximately between 30 and 45 degrees from the axis of the faceplate, wherein the second retaining means can be disengaged by pushing on a lower portion of the carrier until the detent means is pushed below the latch means.

10. The faceplate of claim 1, wherein the carrier is supported at an angle to the plane formed by the length of the faceplate by a wall on the rear surface of the faceplate.

11. The faceplate of claim 1, wherein the carrier further comprises a bore located on the rear surface of the carrier near an upper edge of the carrier and the faceplate further comprises a pin located near an edge of the faceplate wherein the carrier is pivotally connected to the faceplate through engagement of the pin with the bore.

12. A faceplate for a circuit pack having electronic and optical components including a rear fibre connector extending from an optical fibre, the faceplate comprising:

an adapter mounting for mounting an adapter substantially along the axis of the faceplate, the adapter having a top portion, the adapter being used for connecting a forward fibre connector to the rear fibre connector;

a door pivotable from an open position, exposing the adapter mounting, to a closed position, covering the mounting and a mounted adapter, except for the top portion of the adapter, the door comprisng:

a top portion including an indentation between a first segment and a second segment to partially surround and hold the top portion of the adapter when the door is in the closed position;

the top portion further including a living hinge having a hook means on the inner surface on at least one of the first seqment and the second seqment;

the faceplate further comprising a shelf portion extending approximately at right angles to the axis of the faceplate, and extending over the adapter mounting, the shelf comprising:

a first protruding section;

a second protruding section;

an indentation between the first protruding section and the second protruding section to accommodate a portion of the top portion of the adapter; and a latch means protruding from at least one of the first protruding section and the second protruding section, near a forward edge of the shelf for latch and hook engagement of the living hinge of the door to the shelf when the door is in the closed position; and a gap formed within a portion of the faceplate between a lower edge of the adapter mounting and the bottom edge of the door.

13. The faceplate of claim 12, wherein the adapter mounting includes a spring for removably holding the adapter in place within the adapter mounting.

14. The faceplate of claim 12, wherein the adapter mounting extends at an angle relative to the plane formed by the length of the faceplate.

15. The faceplate of claim 12, wherein the door is released from the closed position by pushing on a portion of the top portion of the door, thereby pivoting the living hinge and disengaging the latch means on the shelf from the hook means on the door.

16. A combination of a faceplate and a circuit pack, the circuit pack having electronic and optical components including a rear fibre connector extending from an optical fibre, the faceplate comprising a front surface and a rear surface, the rear surface facing approximately 180° from the front surface, the faceplate having an opening therein through which an adapter may extend for connecting a forward fibre connector to the rear fibre connector, wherein the faceplate comprises an adapter carrier having adapter mounting means for removably mounting the adapter, the carrier being mounted on the rear surface of the faceplate and pivotable laterally along the rear surface of the faceplate from a closed position behind the faceplate to an open position extending laterally beyond an edge of the faceplate, the carrier being detachable from the faceplate when in the open position.

17. The combination of claim 16, wherein the circuit pack comprises at least one printed circuit board and the faceplate is positioned forward of a front edge of the circuit pack.

* * * * *